(12) United States Patent
McClure et al.

(10) Patent No.: US 7,878,162 B2
(45) Date of Patent: Feb. 1, 2011

(54) SYSTEM TO CONTROL EXHAUST GAS TEMPERATURE

(75) Inventors: Thomas R. McClure, Washington, IL (US); Sean O. Cornell, Gridley, IL (US); Robert L. Miller, Dunlap, IL (US); John S. Pipis, Jr., Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1028 days.

(21) Appl. No.: 11/443,085

(22) Filed: May 31, 2006

(65) Prior Publication Data
US 2007/0277510 A1 Dec. 6, 2007

(51) Int. Cl.
*F01L 9/02* (2006.01)

(52) U.S. Cl. .................. 123/90.12; 123/90.13; 123/323; 251/129.19

(58) Field of Classification Search .............. 123/90.12, 123/90.13, 321, 322, 323; 251/129.19; 137/511, 137/625
See application file for complete search history.

(56) References Cited

U.S. PATENT DOCUMENTS

| | | | |
|---|---|---|---|
| 4,664,070 A * | 5/1987 | Meistrick et al. ............... | 123/21 |
| 6,427,436 B1 | 8/2002 | Allansson et al. | |
| 6,644,271 B1 | 11/2003 | Cotton, III | |
| 6,679,224 B2 | 1/2004 | Stanglmaier | |
| 6,718,757 B2 | 4/2004 | Khair et al. | |
| 6,732,507 B1 | 5/2004 | Stanglmaier et al. | |
| 6,742,328 B2 | 6/2004 | Webb et al. | |
| 6,796,165 B2 | 9/2004 | Abdul-Khalek | |
| 6,832,472 B2 | 12/2004 | Huang et al. | |
| 2003/0221663 A1 | 12/2003 | Vanderpoel et al. | |
| 2004/0018132 A1 | 1/2004 | Bartley et al. | |
| 2004/0083994 A1* | 5/2004 | Afjeh et al. | |
| 2004/0123588 A1 | 7/2004 | Stanglmaier et al. | |
| 2004/0163383 A1 | 8/2004 | Khair et al. | |
| 2004/0170548 A1 | 9/2004 | Johnston Bartley et al. | |
| 2004/0237513 A1 | 12/2004 | Bunting et al. | |

FOREIGN PATENT DOCUMENTS

DE 103 52 498 A1 6/2005
DE 10 2004 050 225 A1 4/2006

OTHER PUBLICATIONS

PCT International Search Report, Applicant Ref. No. 05-226; PCT/US2007/008495; International Filing Date: Apr. 4, 2007; Priority Date: May 31, 2006; Applicant: Caterpillar Inc.

* cited by examiner

*Primary Examiner*—Ching Chang

(57) ABSTRACT

A variable valve actuation system is disclosed for providing exhaust to at least one component downstream of an engine. The system includes a supply of low pressure fluid, an engine fluid sump, and an exhaust valve disposed in an engine cylinder. The system also includes a hydraulic actuation system operably connected to the exhaust valve of the engine cylinder and a braking control valve operably connected to the hydraulic actuation system. The system further includes a device for accumulating fluid and a device for fluidly coupling the hydraulic actuation system to the accumulating device.

20 Claims, 2 Drawing Sheets

SYSTEM TO CONTROL EXHAUST GAS TEMPERATURE

TECHNICAL FIELD

This present disclosure relates generally to a system to control exhaust gas and, more particularly, to a method and apparatus to control exhaust gas temperature.

BACKGROUND

Allowable limits of particulates and noxious gases produced by internal combustion engines, including those produced by diesel engines, are generally regulated by government agencies. Manufacturers of such engines have accordingly devised techniques for controlling exhaust emissions. Many engines typically include an exhaust system particulate filter or trap, e.g., a soot filter. Particulate filters are generally designed to collect particulate emissions within the exhaust stream and either continuously or periodically burn off the collected particulates in a particulate filter regeneration mode. During a particulate filter regeneration mode, the temperature within the filter is preferably above a specified regeneration temperature to ensure thorough burning of the collected particulates. Additionally, performance of other exhaust gas treatment components, e.g., catalytic converters, may be improved above specified temperatures.

Particulate filters include active and passive types. Active particulate filters typically include one or more heaters for filter regeneration, and passive particulate filters typically rely on the temperature of the exhaust gas itself to sufficiently elevate the filter temperature for filter regeneration. Particulate filters are usually designed such that normal operation of the engine produces exhaust temperatures at or above a desired temperature to enable filter regeneration. However, under certain engine operating conditions, such as extended periods of engine idling and sustained operation at high engine speeds or low output torque, exhaust gas temperatures produced may be below the filter regeneration temperature and may adversely affect filter regeneration. As a result, particulate filters may frequently become clogged or plugged, thereby requiring unscheduled vehicle maintenance in order to clean the clogged or plugged filter. Additionally, particulate filter clogging or plugging may also result in filter failure through generation of excessive temperatures internal to the filter when soot is burned.

As shown in U.S. Pat. No. 6,427,436 (the '436 patent), a filter system can be used to remove particulate matter from a flow of engine exhaust gas before a portion of the gas is fed back to an intake air stream of the engine. Specifically, the '436 patent discloses an engine exhaust filter containing a catalyst and a filter element. A portion of the filtered exhaust is extracted downstream of the filter and is directed to an intake of the engine through a recirculation loop.

Although the filter system of the '436 patent may protect the engine from an amount of harmful particulate matter, the catalyst may convert sulfur present in the exhaust gas to sulfate. The sulfate may combine with condensed water to form sulfuric acid in the recirculation loop. The recirculation of sulfuric acid may corrode components of the system over time and may hinder the effectiveness and longevity of the system. In addition, the system of the '436 patent may not be capable of regenerating the filter element to remove particulate matter and other exhaust components trapped therein.

The disclosed system is directed to overcoming one or more of the shortcomings set forth above.

SUMMARY OF THE INVENTION

In one aspect, the present disclosure is directed to a variable valve actuation system for providing exhaust to at least one component downstream of an engine. The system includes a supply of low pressure fluid and an engine fluid sump. The system also includes an exhaust valve disposed in an engine cylinder and a hydraulic actuation system operably connected to the exhaust valve of the engine cylinder. The system further includes a braking control valve operably connected to the hydraulic actuation system, a device for accumulating fluid, and a device for fluidly coupling the hydraulic actuation system to the accumulating device.

In another aspect, the present disclosure is directed to a method of providing exhaust downstream of an engine system. The engine system includes a fluid connection between a braking control valve of an engine braking system, a low pressure fluid supply, a hydraulic actuation system, a first piston assembly having a first pressure chamber, a second piston assembly having a second pressure chamber and an exhaust valve, a control valve, and a device for accumulating fluid having a third pressure chamber. The method includes enabling the control valve to open to allow fluid flow to the third pressure chamber of the accumulating device and supplying fluid from a supply of low pressure fluid to the braking control valve. The method also includes enabling the braking control valve to supply the fluid to the hydraulic actuation system. The hydraulic actuation system is operably connected to the braking control valve The method also includes supplying the fluid to fill the first pressure chamber of the first piston assembly via the hydraulic actuation system. The method further includes enabling the first piston assembly to fluidly fill the third pressure chamber of the accumulating device and enabling the second piston to open the exhaust valve based upon an operation of the first piston assembly and the accumulating device.

In yet another aspect, the present disclosure is directed to a variable valve actuation system for providing exhaust utilized in a regeneration process. The system includes a supply of low pressure fluid, an engine fluid sump, a first piston assembly, and a hydraulic actuation system. The system also includes a second piston assembly operatively connected to an exhaust valve of an engine cylinder. The second piston assembly is operably connected to the first piston assembly. The system also includes a braking control valve operably connected to the hydraulic actuation system and a device for accumulating fluid. The system further includes a device for fluidly coupling the hydraulic actuation system and the accumulating device.

DETAILED DESCRIPTION

Figure 1:
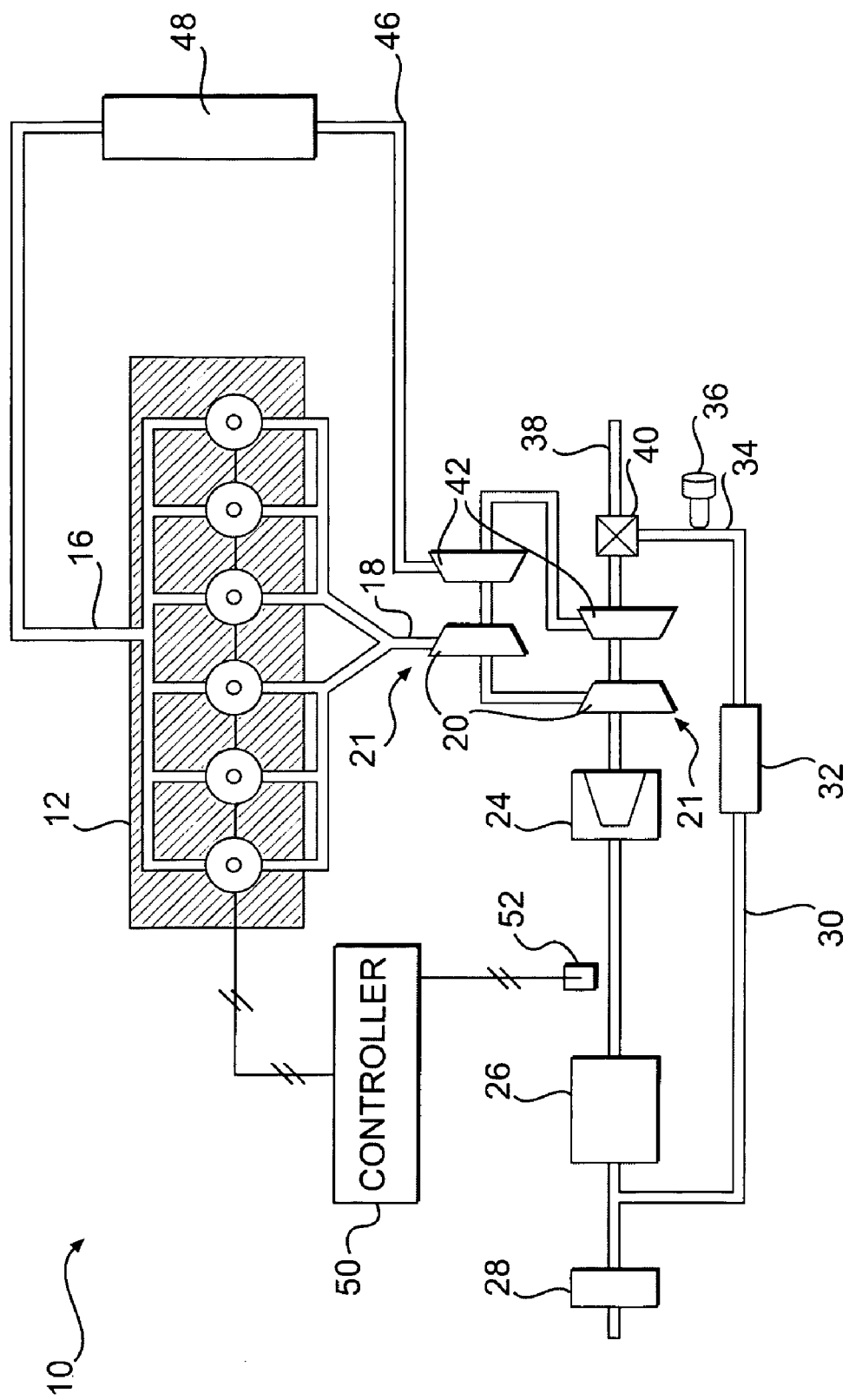
FIG. 1 is a diagrammatic illustration of an engine system having an exhaust gas treatment system according to an exemplary embodiment of the present disclosure.

FIG. 1 illustrates an exemplary exhaust treatment system 10 operatively connected with an internal combustion engine 12. Internal combustion engine 12 may include, for example, a diesel engine, a gasoline engine, a gaseous fluid driven engine, or any other engine known in the art. Internal combustion engine 12 may include one or more piston-cylinder arrangements each of which may operate on a four-stroke cycle, including an intake stroke, a compression stroke, a power stroke, and an exhaust stroke. The movement and positioning of a piston with respect to a cylinder throughout the four-stroke cycle is known in the art and, as such, is not further described. Internal combustion engine 12 may also include one or more intake and/or exhaust valves associated with respective piston-cylinder arrangements. The intake valves may be configured to supply air or a mixture of fuel and air toward a respective cylinder and the exhaust valves may be configured to deliver combustion byproducts, e.g., exhaust gas, toward exhaust treatment system 10.

Exhaust treatment system 10 may be configured to extract energy from the exhaust gas, filter the exhaust gas, and selectively supply filtered exhaust gas back to an intake system of the engine 12. Specifically, the exhaust gas may flow through flow lines 18 to a plurality of turbines 20 associated with a series of turbochargers 21. During this process, energy is extracted from the exhaust gas to drive compressors 42 coupled to turbines 20 of turbochargers 21. It is contemplated that exhaust treatment system 10 may, alternatively, include a single turbocharger or may not include any turbochargers.

After flowing through turbines 20, the exhaust gas may travel through a regeneration device 24 that is configured to increase the temperature of the exhaust gas before a filter 26. Regeneration device 24 may include, for example, a fuel injector and an igniter, heat coils, and/or other heat sources known in the art. Such heat sources may be disposed within regeneration device 24 and may be configured to increase the temperature of the exhaust gas via convection, combustion, and/or other heat transfer methods. It is contemplated that if regeneration device 24 includes a fuel injector and an igniter, regeneration device 24 may receive a supply of fuel and oxygen to facilitate combustion therein. It is also contemplated that regeneration device 24 may, alternatively, be omitted.

Filter 26 may be connected downstream of regeneration device 24 and may receive heated exhaust gas therefrom. Filter 26 may include any type of filter known in the art capable of extracting matter, e.g., soot, from a flow of gas. For example, filter 26 may include a particulate matter filter positioned to extract particulates from exhaust gas, e.g., a ceramic substrate, a metallic mesh, foam, or any other porous material known in the art. It is contemplated that these materials may form, for example, a honeycomb structure within a housing of filter 16 to facilitate the removal of particulates.

After the exhaust gas has traveled through filter 26, it may flow through a catalyst 28 disposed downstream of the filter 26 and/or may flow toward internal combustion engine 12 via a recirculation line 30 and a cooler 32. The amount of exhaust gas recirculated toward internal combustion engine 12 may be controlled by a mixing valve 40 and flow sensor 36. As is know in the art, recirculated exhaust gas may be mixed with ambient intake air 38, compressed by a compressors 42, cooled by an aftercooler 48, and directed toward an intake manifold of the engine 12.

As noted above, the filter 26 may periodically require regeneration to assist in cleaning the filter 26. The process of regeneration requires heating filter 26 to elevated temperatures in order to burn some of the particulates that have collected within the filter. The temperature of the exhaust gas that have traveled through turbines 20 of the turbochargers may not be sufficient to produced regeneration within filter 26. Accordingly, regeneration device 24 may increase the temperature of the exhaust gases directed toward filter 26 to establish the temperature of the exhaust gas above a desired temperature for regeneration. It is contemplated that if regeneration device 24 is selectively omitted, filter 26 may include one or more heat sources and/or catalysts which may aid a regeneration process either by increasing the temperature of exhaust gases and/or by enabling regeneration at lower exhaust gas temperatures.

A controller 50 may be configured to control one or more operations of internal combustion engine 12. Specifically, controller 50 may affect the operation of one or more of the exhaust valves associated with the one or more piston-cylinder arrangements to increase the temperature of exhaust gas delivered from internal combustion engine 12 toward exhaust treatment system 10. Controller 50 may embody an electronic control module and may include one or more microprocessors, a memory, a data storage device, a communications hub, and/or other components known in the art. It is contemplated that controller 50 may be integrated within a general control system capable of controlling additional functions of internal combustion engine 12, e.g., a fuel delivery system. Controller 50 may be configured to receive input signals from a sensor 52 and/or additional input devices, e.g., an operator interface device (not shown), perform one or more algorithms to determine appropriate output signals, and may deliver the output signals to one or more devices to affect the temperature of the exhaust gas produced by internal combustion engine 12. It is contemplated that controller 50 may receive and deliver signals via one or more communication lines (not referenced) as is known in the art. Sensor 52 may include any conventional sensor configured to establish a signal indicative of a temperature of a fluid. Specifically, sensor 52 may be disposed downstream of turbines 20 of turbochargers 21 and upstream of filter 26. The process of increasing the temperature of the exhaust gas delivered from internal combustion engine 12 toward exhaust treatment system will be described in connection with FIG. 2 below.

Figure 2:
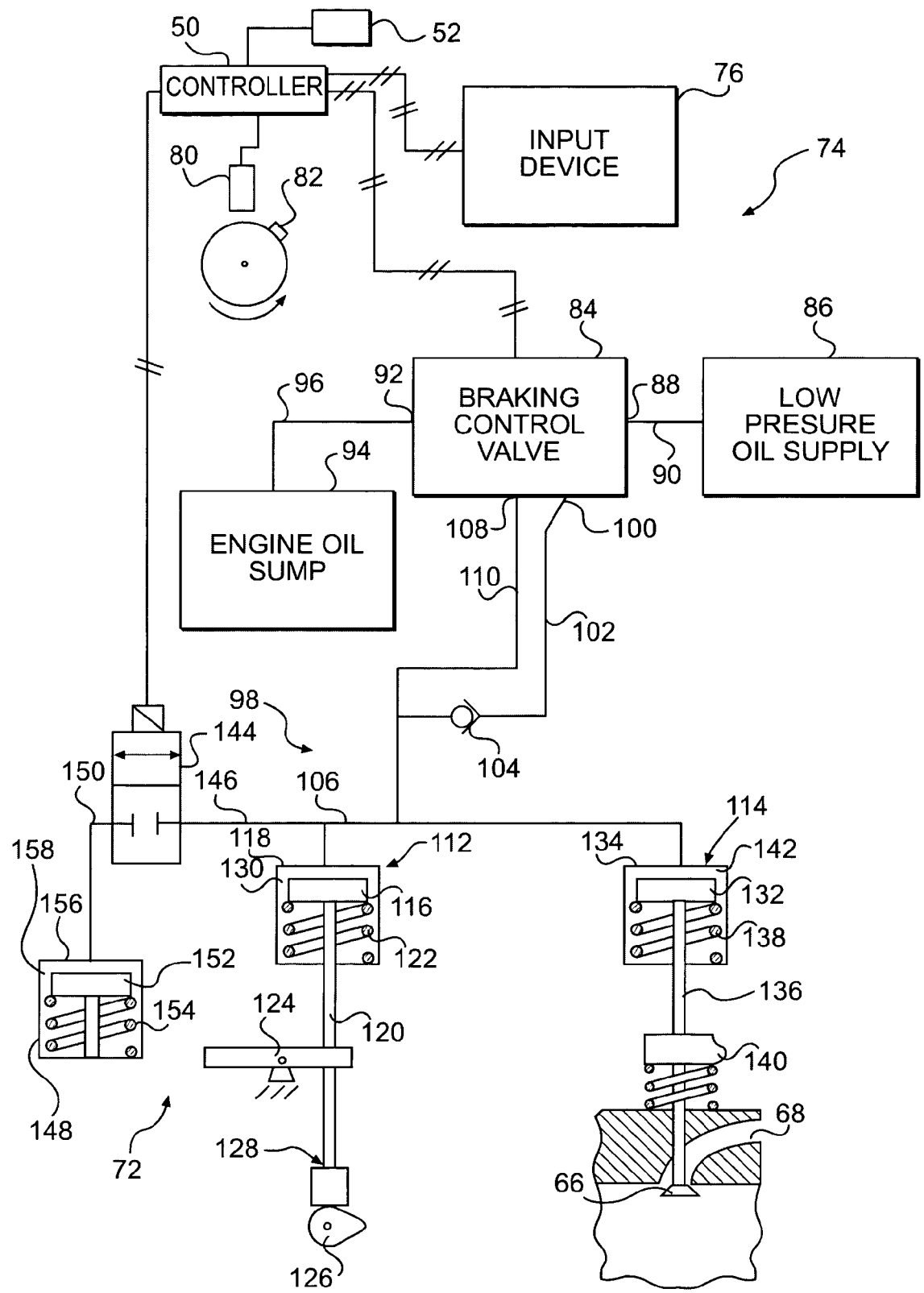
FIG. 2 is a schematic illustration of a variable valve actuation system utilized to control exhaust gas regeneration temperature of the exhaust gas treatment system of FIG. 1.

FIG. 2 illustrates a variable valve actuation system 72 configured to control the movement of an exhaust valve 66 of the internal combustion engine 12. Specifically, controller 50 may in response to a need for providing increased temperature exhaust for a regeneration process adjust the movement of exhaust valve 66. Variable valve actuation system 72 may include an engine braking system 74 configured to adjust the movement of exhaust valve 66 to reduce the power output of internal combustion engine 12, a control valve 144, and an accumulator 148.

Engine braking system may include, for example, an engine compression braking system, for a multi-cylinder engine including an input device 76 electrically coupled to controller 50. Input device 76 may be, for example, a selectively switchable control available in an operator compartment of a vehicle, an automatic switch associated with a vehicle brake pedal, or any other known method of providing an input signal. Optionally, engine braking system 74 may include a sensor 80 configured to sense a crankshaft position indicator 82. The indicator 82 may be correlated to a top-dead-center position of a piston of a piston-cylinder arrangement.

Engine braking system 74 may further include a low pressure supply 86 of hydraulic fluid. For example, low pressure supply 86 may be the lubrication oil passed through the engine gallery to lubricate bearings and other engine components. Braking control valve 84 may include a supply port 88 fluidly coupled to low pressure supply 86 via a hydraulic line 90. Braking control valve 84 may also include a vent port 92 fluidly coupled to an engine fluid sump 94 via a hydraulic line 96. Controller 50 may be electrically coupled to one or more braking control valves 84. Although only one braking control valve 84 is illustrated, it is contemplated that more than one braking control valve 84 may be required for an engine having multiple piston-cylinder arrangements.

Braking control valve 84 may include an actuation port 100 fluidly coupled to valve actuation system 98 via a hydraulic manifold 102 which may include a check valve 104 arranged therein to prevent fluid from flowing through hydraulic manifold 102 toward braking control valve 84. Braking control valve 84 may also include a drain port 108 fluidly coupled to valve actuation system 98 via hydraulic line 110.

The engine braking system 74 may also include a hydraulic actuation system 98, associated with exhaust valve 66. Hydraulic actuation system 98 may include a first piston assembly 112 and a second piston assembly 114. First piston assembly 112 may include a piston 116 slidable in a housing 118 and coupled with a plunger 120. A spring 122 may be disposed within housing 118 and configured to urge piston 116 in a first direction. Plunger 120 may be mechanically coupled to a rocker arm 124 associated with, for example, a fuel injection system (not shown). Rocker arm 124 may be mechanically coupled to a rotatable cam 126, e.g., a cam having a cam profile that determines fuel injection timing, and an associated cam follower 128 so as to transfer rotational motion of the cam 126 into linear motion of the piston 116 in the first direction. Piston 116 and housing 118 may define a first pressure chamber 130 in fluid communication with an actuator manifold 106. It is contemplated that rocker arm 124 may, alternatively, be independent of the fuel injection system.

Second piston assembly 114 may include a piston 132 slidable in a housing 134 and coupled with a plunger 136. A spring 138 may be disposed within housing 134 and configured to urge piston 132 in a first direction. A plunger 136 may be mechanically coupled to a rocker arm 140 and associated with exhaust valve 66. Piston 132 and housing 134 may be configured to define a second pressure chamber 142 in fluid communication with actuator manifold 106. It is contemplated that rocker arm 140 may be mechanically coupled to a rotatable camshaft, cam, and associated cam follower (not shown) so as to transfer rotational motion of the camshaft to linear motion of exhaust valve 66 to affect movement, e.g., opening and closing, thereof.

Control valve 144 may be configured to control a flow of pressurized fluid from actuator manifold 106 toward accumulator 148. Specifically, control valve 144 may include a two-position solenoid actuated valve. Controller 50 may be configured to affect movement of control valve 144, via a suitable control signal, between a first position in which pressurized fluid may be allowed to flow from actuator manifold 106 toward accumulator 148 and a second position in which pressurized fluid may be blocked from flowing from actuator manifold 106 toward accumulator 148. It is contemplated that in an engine braking mode, control valve 144 may be in the second position such that substantially no fluid would be allowed to flow toward accumulator 148. It is also contemplated that in a regeneration mode, control valve 144 may be in the second position to allow hydraulic fluid therethrough, through hydraulic line 146, and toward accumulator 148. It is also contemplated that control valve 144 may include any suitable valve configured to control a flow of pressurized fluid from actuator manifold 106 toward accumulator 148, such as, for example, a mechanically or hydraulically actuated multi-position valve.

Accumulator 148 may receive pressurized fluid, when control valve 144 is in the first position, from actuator manifold 106 via a passageway 150. Specifically, accumulator 148 may embody a fixed-volume accumulator and may include a piston 152 and a spring 154 disposed within a housing 156. Piston 152 and housing 156 may be configured as a third pressure chamber 158 in fluid communication with the actuator manifold 106. It is contemplated that accumulator 148 may embody any suitable type of accumulator configured to accumulate any amount of pressurized fluid, e.g., an amount less than, equal to, or greater than the displacement of first piston assembly 112. As such, the amount of fluid accumulated within 148, in conjunction with the operation of control valve 144 may provide adjustable timing of exhaust valve 66.

INDUSTRIAL APPLICABILITY

The disclosed system to control exhaust gas temperature may be applicable for any combustion engine. The disclosed system may adjust the timing of one or more exhaust valves associated with an internal combustion engine to increase the temperature of the exhaust gas directed toward downstream components, e.g., regenerators, filters, catalytic converters, and/or any other components known in the art. The operation of valve actuation system 72 is explained below.

Controller 50 may enter an engine braking mode in response to a signal from input device 76. During an engine braking mode, fuel supply to internal combustion engine 12 may be stopped. Controller 50 may receive signals from sensor 80 to establish appropriate timing during the engine braking mode such that compressed air is released from one or more cylinders of internal combustion engine 12 by opening an exhaust valve associated therewith when the piston is near a top-dead-center position of a compression stroke. It is contemplated that compressed air may be released from any number of cylinders to facilitate the desired braking affect during a particular engine braking mode.

In the engine braking mode, controller 50 may deliver signals to braking control valve 84 to fluidly couple supply port 88 and actuation port 100 and may block fluid communication between drain port 108 and sump 94. As a result, hydraulic fluid from low pressure supply 86 may flow toward hydraulic manifold 102 and may be available for use by hydraulic actuation system 98. If the pressure of hydraulic fluid in hydraulic manifold 102 overcomes check valve 104, the pressurized fluid may flow toward the actuator manifold 106, return line 110, and toward first and second pressure chambers 130, 142. Check valve 104 may be configured to maintain the pressurized fluid available to the valve actuation system 98 at a predetermined pressure by allowing pressurized fluid to flow from hydraulic manifold 102 when the pressure of fluid in the associated actuator manifold 106 and return line 110 drops below a predetermined pressure. During an engine braking mode, control valve 144 may be in the second position and may substantially block flow of pressurized fluid from actuator manifold 106, hydraulic line 146, and toward accumulator 148.

When braking control valve 84 is enabled, piston assembly 112, e.g., a "master" piston assembly, may act as a pump, providing pressurized fluid to piston assembly 114, e.g., a "slave" piston assembly. For example, linear movement of piston 116 of first piston assembly 112 in a direction of the force of spring 122, in response to motion of cam 126, cam follower 128, and rocker arm 124, may cause linear movement of piston 132 of second piston assembly 114. Specifically, the pressurized fluid within first pressure chamber 130, actuator manifold 106, return line 110, and second pressure chamber 142 may not be relieved and piston 132 of second piston assembly 114 may be moved in a direction opposite to the force of spring 138. Plunger 136 may be urged downward against rocker arm 140, which may urge exhaust valve 66 to an open position. The open position of the exhaust valve 66 allows compressed air to escape the cylinder thereby performing an engine braking function as is known in the art. As such, rotation of the cam 126 causes the exhaust valve 66 to open and close in a cyclical manner during the engine braking mode. It is contemplated that in certain embodiments, exhaust valve 66 may be opened approximately 15 degrees before top dead center of a compression stroke.

When controller 50 is not operated in the engine braking mode, the braking control valve 84 is not actuated and pressurized fluid may be blocked from flowing toward actuation port 100 and the drain port 108 may be in fluid communication with engine fluid sump 94 via vent port 92.

The temperature of the exhaust gas directed downstream of engine 12, may be increased by regulating the movement of exhaust valve 66 via variable valve actuation system 72. Specifically, sensor 52 may deliver a signal to controller 50 indicative of a temperature below a predetermined value and controller 50 may determine that it is desirable to increase the temperature of the exhaust gas. Additionally, controller 50 may receive a signal from sensor 80 to establish a timing associated with the crankshaft and thus the pistons of internal combustion engine 12. For example, controller 50 may determine the appropriate timing such that combustion air and/or exhaust gas may be released from the piston-cylinder arrangement associated with exhaust valve 66. That is, controller 50 may be configured to open exhaust valve 66 during a power stroke of a piston. It is contemplated that in certain embodiments, exhaust valve 66 may be opened at approximately 20-30 degrees after top-dead center of a power stroke of a four-stroke combustion cycle.

Controller 50 may deliver a signal to control valve 144 to actuate the valve to the first position. As such, pressurized fluid may be allowed to flow through control valve 144. Controller 50 may also deliver a signal to braking control valve 84 to actuate the valve to allow pressurized fluid to flow from supply port 88 toward actuation port 100 and block fluid from flowing from drain port 108 toward the sump 94. As such, pressurized fluid from low pressure supply 86 may flow toward hydraulic manifold 102, may overcome check valve 104, and flow toward actuator manifold 106. Additionally, pressurized fluid may flow toward return line 110, first pressure chamber 130, second pressure chamber 142, and third pressure chamber 158.

Similar to the operation in the engine braking mode, "master" piston assembly 112 may, in response to the rotation of cam 126, act as a pump providing pressurized fluid to "slave" piston assembly 114. However, control valve 144 may be actuated to the first position which may allow pressurized fluid to flow therethrough and toward accumulator 148. As such, pressurized fluid displaced by piston 116 may be directed toward both piston 152 and piston 132. After displacement of piston 152 and filling of accumulator 148, piston 132 may be moved in a direction opposite to the force of the spring 138. As a result, plunger 136 of the second piston assembly 114 may be urged downward against rocker arm 140 to urge the exhaust valve 66 to an open position. The open position of the exhaust valve 66 may allow combustion air and/or exhaust gas to flow through exhaust outlet 68. Because accumulator 148, and in particular the displacement of piston 152, delays the movement of piston 132, exhaust valve 66 may, in certain embodiments, be controlled to open at approximately 20°-30° of a power stroke.

It is contemplated that the opening and timing of exhaust valve 66 of hydraulic system 98 may be predetermined to produce a desired amount of high temperature exhaust downstream of internal combustion engine 12. Additionally, the amount of fluid accumulated within accumulator 148 may affect the amount of displacement of second piston assembly 114. For example, if accumulator 148 accumulates the entire amount of fluid displaced by first piston assembly 112, second piston assembly 114 may not be displaced. Additionally, the actuation of control valve 148 may be controlled to limit the amount of fluid allowed to flow toward accumulator 148. For example, assuming accumulator 148 may be capable of accumulating the entire amount of fluid displaced by first piston assembly 112, controller 50 may be configured to move control valve 144 toward the first position to substantially block the flow of fluid from first piston assembly 112 toward accumulator 148. Thus, even though accumulator 148 may be capable of accumulating more fluid, control valve 144 may limit the amount thereof. As such, the size of accumulator 148 and the actuation of control valve 144 may be controlled such that the variable timing of exhaust valve 66 may be infinitely adjusted between substantially no actuation of exhaust valve 66 and substantially no variation of actuation of exhaust valve 66 with respect to the timing associated with the engine braking mode. Additionally, if accumulator 148 accumulates less fluid than may be displaced by first piston assembly 112, control valve 144 may be controlled to the first position to allow a flow of fluid toward accumulator 148, accumulator 148 may absorb a portion of the fluid displaced by first piston assembly 112, and a remaining portion of the fluid displaced by first piston assembly 112 may displace second piston assembly 114. As such, the size of accumulator 148 may be determined to absorb a given amount of fluid displaced by first piston assembly 112 and such that a particular variable timing of exhaust valve 66 may be achieved. It is contemplated that any number of the exhaust valves associated with the one or more piston-cylinder arrangements of internal combustion engine 12 may be opened during a power stroke.

Because controller 50 may allow pressurized fluid to flow toward the hydraulic system 98 by controlling braking control valve 84 when a braking mode is not desired and allow pressurized fluid to flow toward accumulator 148 by controlling control valve 144, the fluid displacement caused by piston 116 may be absorbed within accumulator 148. Additionally, exhaust valve 66 may be opened approximately 20°-30° after top-dead-center position of a power stroke and, as such, high temperature exhaust gas may be delivered downstream of internal combustion engine 12.

It will be apparent to those skilled in the art that various modifications and variations can be made to the disclosed system to control exhaust gas temperature. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A variable valve actuation system for providing exhaust to at least one component downstream of an engine, comprising:

a supply of low pressure fluid;
an engine fluid sump;
an exhaust valve disposed in an engine cylinder;
a hydraulic actuation system operably connected to the exhaust valve of the engine cylinder;
a braking control valve operably connected to the hydraulic actuation system;
an accumulator; and
a control valve for selectively fluidly coupling the hydraulic actuation system to the accumulator.

2. The system according to claim 1, wherein the hydraulic actuation system includes:
a first piston assembly; and
a second piston assembly operatively connected to the exhaust valve and the first piston assembly.

3. The system according to claim 1, wherein the braking control valve is further configured to alternatively allow fluid flow from the supply of low pressure fluid and toward the engine fluid sump.

4. The system according to claim 3, wherein the braking control valve is operable to fluidly couple the hydraulic actuation system to the engine fluid sump while blocking the supply of low pressure fluid or to fluidly couple the hydraulic actuation system to the supply of low pressure fluid while blocking the engine fluid sump.

5. The system according to claim 1, further comprising:
a check valve associated with the hydraulic actuation system, the check valve being configured to prevent fluid flow from the hydraulic actuation system to the supply of low pressure fluid.

6. The system according to claim 1, further comprising:
a hydraulic manifold coupled to the braking control valve, the hydraulic manifold being fluidly coupled to the hydraulic actuation system.

7. The system according to claim 1, further comprising:
an electronic control module configured to actuate the control valve and the braking control valve.

8. The system according to claim 7, wherein the control valve comprises a two-way solenoid control valve and the electronic control module enables an opening and closing of the two-way control valve.

9. The system according to claim 8, further comprising an engine having a combustion cycle wherein the exhaust valve opens approximately 20°-30° after top-dead center position of a power stroke.

10. The system according to claim 1, further comprising:
an electronic control module configured to control actuation of the braking control valve with respect to a piston position within an engine cylinder.

11. A method of providing exhaust downstream of an engine system having a fluid connection between a braking control valve of an engine braking system, a low pressure fluid supply, a hydraulic actuation system, a first piston assembly having a first pressure chamber, a second piston assembly having a second pressure chamber and an exhaust valve, a control valve, and a device for accumulating fluid having a third pressure chamber, the method comprising:
enabling the control valve to open to allow fluid flow to the third pressure chamber of the accumulating device;
supplying fluid from a supply of low pressure fluid to the braking control valve;
enabling the braking control valve to supply the fluid to the hydraulic actuation system, the hydraulic actuation system being operably connected to the braking control valve;
supplying the fluid to fill the first pressure chamber of the first piston assembly via the hydraulic actuation system;
enabling the first piston assembly to fluidly fill the third pressure chamber of the accumulating device; and
enabling the second piston to open the exhaust valve based upon an operation of the first piston assembly and the accumulating device.

12. The method according to claim 11, wherein the operation of the first piston assembly includes fluidly filling the first pressure chamber and the third pressure chamber.

13. The method according to claim 11, further comprising:
preventing fluid flow from the hydraulic actuation system to the supply of low pressure fluid via the braking control valve.

14. The method according to claim 11, further comprising:
opening the exhaust valve at 20°-30° after top-dead center position of a power stroke in a combustion cycle.

15. A variable valve actuation system for providing exhaust utilized in a regeneration process, comprising:
a supply of low pressure fluid;
an engine fluid sump;
a first piston assembly;
a hydraulic actuation system;
a second piston assembly operatively connected to an exhaust valve of an engine cylinder, wherein the second piston assembly is operably connected to the first piston assembly;
a braking control valve operably connected to the hydraulic actuation system;
an accumulator; and
a control valve for selectively fluidly coupling the hydraulic actuation system and the accumulator.

16. The system according to claim 15, wherein the braking control valve is further configured to alternatively allow fluid flow from the supply of low pressure fluid and toward the engine fluid sump.

17. The system according to claim 16, wherein the braking control valve is operable to fluidly couple the hydraulic actuation system to the engine fluid sump while blocking the supply of low pressure fluid or to fluidly couple the hydraulic actuation system to the supply of low pressure fluid while blocking the engine fluid sump.

18. The system according to claim 15, further comprising:
an electronic control module configured to actuate the control valve and the braking control valve.

19. The system according to claim 18, wherein the control valve comprises a two-way solenoid control valve and the electronic control module enables an opening and closing of the two-way control valve.

20. The system according to claim 19, further comprising a engine having a combustion cycle wherein the exhaust valve opens approximately 20°-30° after top-dead center position of a power stroke.

* * * * *